United States Patent Office 2,694,643
Patented Nov. 16, 1954

2,694,643

FAT-CONTAINING BASE FOR FOOD PRODUCTS AND METHOD OF MAKING SAME

Francis E. Robinson and Winthrop F. Bronson, Chicago, Ill., assignors to Wilson & Co., Inc., a corporation of Delaware No Drawing. Application December 1, 1951, Serial No. 259,512

12 Claims. (Cl. 99—123)

This invention relates to a dry-to-the-touch, free flowing, readily dispersible, fat-containing base or shortening which is particularly adapted for use in the preparation of frozen desserts, candies, cakes, and other alimentary products.

The product of the present invention comprises a particle of fat encased in a dry, soluble coating of a homogeneous mixture of gelatine and sugar. The gelatin-sugar mixture forms a protective coating for the fat particle and, being readily soluble in cold water or cold aqueous mixtures, releases and disperses the fat particle in these media when introduced therein, and maintains the same in a relatively stable state of suspension.

The fat-containing base of the present invention may be made by forming an emulsion of the fat, gelatin and sugar, adjusting the pH of the emulsion as hereinafter described, and then drying the emulsion as by spray drying or other conventional drying procedures.

The fat-containing base of the present invention simulates a dry powder. It is not greasy or oily to the touch, has very little tendency to aggregate in the absence of moisture, and is extremely easy to handle. It may be placed in ordinary containers used for the packaging of food products such as sugar or salt; it may be readily transferred from one container to another without loss due to adhesion to the walls of the container; and it may be poured from the container like sugar or salt.

The fat-containing base or shortening of the present invention has very little tendency towards rancidity even in the absence of refrigeration and has a relatively long shelf life over the wide range of temperature and moisture conditions encountered in this country. It appears that the shell or casing of the gelatin-sugar mixture about the fat particle protects the same from the factors responsible for the normal deterioration of unprotected fat, to an extent perhaps even greater than that obtained when the fat is protected in accordance with standard procedures. Food products made with the base of the present invention are wholesome and palatable.

When the coated fat particles of the present invention are stirred in water or in an aqueous solution or dispersion, the fat contained therein is dispersed in these media with great rapidity and ease and with great uniformity, perhaps even greater than the best of the coated fat particles heretofore known to the prior art. The fat-containing base may be readily incorporated into dry mixtures with any common type of blender and the blending temperature is not critical as with the blending of plastic fats or oils.

The appearance of dry mixes containing our product are more appealing to the eye than are mixes containing plastic fats and oils. This increases the salability of the mix. In addition, our product enhances the stability, body, texture and eating qualities of frozen desserts and other food products made therewith.

In the description to follow, all parts given are parts by weight. Similarly, percentages indicated are percentages by weight.

In making the shortening of the present invention, proportions of the constituents may be varied rather widely. To make the product in accordance with our preferred procedure, we first make an emulsion of fat, sugar and gelatin, the pH of the emulsion being adjusted as described below. In preparing the emulsion, the fat, sugar and gelatin are mixed together, dry or with water, and then sufficient water is added to obtain a fluid, free-flowing emulsion.

In the emulsion, the amount of fat may vary, for example from between about 3% to 60%. The amount of sugar (dry), which preferably is roughly inversely proportional to the amount of fat used, may vary between about 20 to 75%. The gelatin (dry) should be between about 0.25 to 2% by weight of the final emulsion. Preferred proportions of the ingredients in the emulsion are:

| | Percent |
|---|---|
| Fat | 25 to 35 |
| Sugar (dry) | 40 to 50 |
| Gelatin (dry) | 1 |
| Water | 20 to 30 |

After the emulsion is made, it is homogenized and then dried according to conventional procedure, for example spray drying, pan drying, or drum drying. When the dried product is placed in water, the pH closely approximates the pH of the emulsion.

The constituents of the dried product may vary rather widely, for example in the approximate ranges indicated below:

| | Percent |
|---|---|
| Fat | 70 to 4 |
| Sugar | 25 to 95 |
| Gelatin | 0.3 to 2.4 |

We prefer the following proportions in the dried product.

| | Percent |
|---|---|
| Fat | 40 to 60 |
| Sugar | 57 to 37 |
| Gelatin | 1 |

The fat used may be any edible animal or vegetable fat or mixtures of such fats. They may be solid, semi-solid or liquid fats. Examples of fats which are suitable for use in the present invention are beef fat, pork fat, lamb fat, butterfat, soybean oil, cottonseed oil, peanut oil, coconut oil, sesame seed oil, sunflower seed oil, sardine oil and other fish oils. Fat-containing materials such as egg yolks may also be employed.

The sugar may be any edible, cold water soluble sugar such as dextrose, fructose, lactose, sucrose or maltose. Combinations of suitable sugars may also be employed. We prefer to use sugar in the form of corn syrup, particularly corn syrup in which the percentage of reducing sugars, calculated as dextrose, is low. For example, a corn syrup having a value of 24% reducing sugars calculated as dextrose is highly desirable since such a sugar is not hygroscopic and the product will not cake or become lumpy when packaged.

Gelatin from either an acid treated precursor (acid type), such as pork skin gelatin, or an alkali treated precursor (alkali type), such as bone gelatin or calf skin gelatin, may be used. The acid type gelatin generally has an isoelectric point between pH of about 7 to 9, usually about 8. The alkali type gelatin usually has an isoelectric point between pH of about 4.7 to 5.2. We have found that in making the product of the present invention, the stability of emulsion is greatly increased if the pH of the emulsion is maintained substantially outside the isoelectric point of the gelatin. Thus, with the acid type gelatin, the pH of the emulsion should be adjusted preferably between about 2 to 4.3. At a pH higher than about 4.5, the emulsion tends to become unstable. With the acid type gelatin, to remove the pH from the isoelectric point on the alkaline side, so as to stabilize the emulsion, requires a pH of about 11 or so and such a high pH will result in objectionable soapiness and, frequently, offensive odors which are undesirable in a food product. In consequence, adjustment of the pH of an acid type gelatin to a pH on the alkaline side is not a preferred practice in accordance with the present invention.

With the alkali type gelatin, the pH of the emulsion must be maintained on the acid side between pH of about 1 to 3, preferably about 1. Alkali type gelatins can also be used at an adjusted pH of about 6 to 8 or higher, but again if the pH becomes too alkaline, saponification and offensive odors frequently occur. We prefer to use the acid type gelatin.

Any edible acid may be used to lower the pH below the isoelectric point. We prefer to use a dry crystalline acid such as tartaric acid, malic acid, citric acid or phosphoric acid. Lactic acid, acetic acid, hydrochloric acid or other acids may also be employed. If the pH is to be adjusted above the isoelectric point, bases such as sodium bicarbonate, sodium carbonate, magnesium oxide or calcium hydroxide may be used for this purpose.

When the dried product is placed in water, the pH of the mixture approximates the pH of the emulsion before drying to within 0.2 pH to 0.4 pH.

The following examples are illustrative of compositions from which we have made fat-containing bases in accordance with the present invention.

*Example 1*

|  | Parts | Parts Dry Solids |
|---|---|---|
| Beef fat (97° F. M. P.) | 250 | 250 |
| Corn syrup, 24 D. E. (96% solids) | 188 | 180 |
| Corn syrup, 30 D. E. (96% solids) | 70.6 | 68 |
| Pork skin gelatin, 75 bloom, acid type | 7.5 | 7.5 |
| Tartaric acid | 0.83 | 0.83 |
| Water | 168 |  |
| Total Weight | 684.93 | 506.33 |

Percent dry solids _____ 72.0
Percent fat in dry solids _____ 50.8

The term D. E. is the abbreviation for dextrose equivalent by which is meant the percentage of reducing sugars calculated as dextrose. The composition of dry solids in each of the corn syrups mentioned above is:

|  | Dextrose, Percent | Maltose, Percent | Higher Sugars, Percent | Dextrins, Percent |
|---|---|---|---|---|
| Corn syrup, 24 D. E. | 8.0 | 8.5 | 20.5 | 63.0 |
| Corn syrup, 30 D. E. | 11.5 | 13.0 | 21.0 | 54.5 |

The beef fat used was made by conventional pressing operations to obtain a melting point fraction of 97° F.

The corn syrups were dissolved in 128 parts of water after which the fat was added and mixed into the batch with a high speed propeller type agitator. Gelatin and tartaric acid were dissolved in 40 parts of hot water and added to the batch after the fat was mixed in. The mixture was then heated to 150° F. and homogenized in two stages at 2200 and 800 pounds pressure. The pH of this emulsion was 3.15. The emulsion was spray dried in accordance with conventional procedures. Fifty grams of the dried product were placed in 50 ml. water, giving a pH of 3.45.

The above prepared base was incorporated into a frozen dessert, the composition being as follows:

```
                                                Parts
Base _____   1.33
Spray dried milk products (5.0% fat) _____   2.88
Cane sugar _____   2.01
Dry corn syrup solids, 24 D. E. _____   1.37
Sodium carboxy methyl cellulose _____   0.03
Water _____  12.00
```

The dry ingredients were mixed together and then added to the water which was cold. The mixture was then agitated for two minutes in a conventional home type beater, vanilla flavoring being added during beating. The mixture was then placed in a batch freezer and frozen in the conventional manner. When the material had the desired stiff consistency it was withdrawn from the freezer. The frozen material was very smooth and had excellent eating qualities.

*Example 2*

```
                                                Parts
Pork skin gelatin, 75 bloom _____  15.0
Water _____ 141.7
Tartaric acid _____   1.2
Corn syrup, 24 D. E. (82% solids) _____ 467.8
Beef fat (97° F. M. P.) _____ 268.3
```

The gelatin and tartaric acid were dissolved in water and this mixture together with the corn syrup was added to the fat. The pH of the mixture was about 3. The mixture was stirred and heated to 150° F. after which time the material was homogenized and dried as in Example 1.

Two frozen desserts were prepared with the above base, one with milk, and one with water. The formula for the frozen dessert mix prepared with milk was as follows:

```
                                                Grams
Base _____  71
Beet sugar _____  45.4
Milk solids, nonfat _____  15.0
Sodium carboxy methyl cellulose _____   0.70
Salt _____   0.45
Vanilla powder _____   2.5
Coloring material _____   0.014
```

The coloring material used was a mixture of F. D. & C. Yellow Nos. 5 and 6, the term "F. D. & C." signifying that the dye has been certified by the Food and Drug Administration. The mixture was stirred into one and a half cups of cold milk after which it was poured into an ice cube tray of a refrigerator and held there until practically all of the liquid had become solid. The frozen mix was removed from the ice cube tray, broken into pieces with a spatula and then whipped with a conventional home type beater, the blades and bowl of which had first been chilled in the refrigerator. After the mix was whipped to a smooth consistency, the mix was returned to the ice cube tray and frozen until hard enough for serving. The consistency and eating qualities were excellent.

The frozen dessert prepared with water had the following formula:

```
                                                Grams
Base _____  96.4
Cane sugar _____  30.0
Milk solids, nonfat _____  40.0
Sodium carboxy methyl cellulose _____   0.7
Vanilla powder _____   2.4
Salt _____   0.5
Coloring material (as above) _____   0.014
```

The above ingredients were mixed and then added to one and a half cups of cold water after which the material was treated in the same manner as the aforementioned dessert prepared with milk. Again the product had excellent eating qualities and smooth consistency.

*Example 3*

```
                                                Parts
Pork skin gelatin, 75 bloom _____   7.5
Water _____ 141.7
Tartaric acid _____   0.6
Corn syrup, 42 D. E. (82% solids) _____ 467.8
Beef fat (97° F. M. P.) _____ 268.3
```

The product was then treated as above described in Example 2. The pH of the emulsion before drying was about 3. The final product dispersed readily in cold water.

*Example 4*

```
                                                Parts
Pork skin gelatin, 75 bloom _____   150
Water _____  2835
Tartaric acid _____    12
Corn syrup, 42 D. E. (82% solids) _____  9355
Beef fat (97° F. M. P.) _____  5359
```

The products were mixed and treated as above described in Example 2, the pH of the emulsion before drying being about 3. A very satisfactory product was obtained.

*Example 5*

```
                                                 Parts
Pork skin gelatin, 75 bloom _____   22.5
Water _____  680.4
Tartaric acid _____    1.8
Cane sugar _____ 1148.2
Beef fat (97° F. M. P.) _____  808.0
```

The products were mixed and treated as above described in Example 2, the pH of the emulsion before drying being about 3. A very satisfactory product was obtained.

*Example 6*

```
                                                 Parts
Pork skin gelatin, 75 bloom _____   22.5
Water _____  425.2
Tartaric acid _____    1.8
Soybean oil-cottonseed oil blend _____  808.0
Corn syrup, 42 D. E. (82% solids) _____ 1403.0
```

The soybean oil-cottonseed oil blend was composed of a mixture of 40% soybean oil and 60% cottonseed oil to which was added 6% of an emulsifier composed of mono and diglycerides (monoglyceride 40%).

The products were mixed and treated as above described in Example 2, the pH of the emulsion before drying being about 3. A very satisfactory product was obtained.

*Example 7*

| | Parts |
|---|---|
| Beef fat (97° F. M. P.) | 269 |
| Corn syrup, 42 D. E. (86% solids) | 468 |
| Alkaline bone type gelatin, 200 bloom | 7.5 |
| Water | 141.0 |
| Sodium bicarbonate | 0.27 |

The analysis of the corn syrup used was: 22% dextrose, 21% maltose, 20% higher sugars and 37% dextrins.

The gelatin and sodium bicarbonate were dissolved in water and the corn syrup and fat were then added to the mixture. The mix was then heated to 160° F. and homogenized in two stages at 2200 and 800 pounds pressure. The pH of the emulsion after homogenization was 7.2. The product was then dried in a conventional manner. The product dispersed readily when agitated with cold water. Ten grams of the dried product in 90 ml. of water gave a pH of 6.9.

The dried fat-containing food product of the present invention may also be utilized in the making of cakes, pastries, candies and other food products in which a homogeneous dispersion of fat particles is desired.

Our invention is not to be construed as limited to the illustrative examples as modifications thereof in proportions, type of constituents, procedure, etc. may be made without departing from the spirit or scope of the invention.

We claim:

1. A dry-to-the-touch, free flowing, readily dispersible, fat-containing base comprising a fat particle encased in a cold water soluble coating of a homogeneous mixture of an edible sugar and gelatin as the main constituents.

2. A dry-to-the-touch, free flowing, readily dispersible, fat-containing base comprising a fat particle encased in a cold water soluble coating of a homogeneous mixture of an edible sugar and an acid type gelatin as the main constituents.

3. A dry-to-the-touch, free flowing, readily dispersible, fat-containing base comprising a fat particle encased in a cold water soluble coating of a homogeneous mixture of an edible sugar and an alkaline type gelatin as the main constituents.

4. A dry-to-the-touch, free flowing, readily dispersible, fat-containing base comprising a plurality of fat particles, each of said fat particles being encased in a cold water soluble coating of a homogeneous mixture of an edible sugar and an acid type gelatin as the main constituents, the pH of a mixture of said base and water being between about 2 to 4.3.

5. A dry-to-the-touch, free flowing, readily dispersible, fat-containing base comprising a plurality of fat particles, each of said fat particles being encased in a cold water soluble coating of a homogeneous mixture of an edible sugar and an alkaline type gelatin as the main constituents, the pH of a mixture of said base and water being between about 1 to 3.

6. A dry-to-the-touch, free flowing, readily dispersible, fat-containing base comprising a plurality of fat particles, each of said fat particles being encased in a cold water soluble coating of a homogeneous mixture of an edible sugar and an alkaline type gelatin as the main constituents, the pH of a mixture of said base and water being between about 6 to 8.

7. A dry-to-the-touch, free flowing, readily dispersible, fat containing base comprising a plurality of fat particles, each of said fat particles being encased in a cold water soluble coating of a homogeneous mixture of an edible sugar and an acid type gelatin, each fat particle consisting essentially of from about 4% to 70% of fat, from about 25% to 95% of sugar and from about 0.3 to 2.4% of gelatin, the pH of a mixture of said base and water being between about 2 to 4.3.

8. A dry-to-the-touch, free flowing, readily dispersible, fat-containing base comprising a plurality of fat particles, each of said fat particles being encased in a cold water soluble coating of a homogeneous mixture of an edible sugar and an alkaline type gelatin, each fat particle consisting essentially of from about 4% to 70% of fat, from about 25% to 95% of sugar and from about 0.3 to 2.4% of gelatin, the pH of a mixture of said base and water being about 1 to 3.

9. A dry-to-the-touch, free flowing, readily dispersible, fat-containing base comprising a plurality of fat particles, each of said fat particles being encased in a cold water soluble coating of a homogeneous mixture of an edible sugar and an alkaline type gelatin, each fat particle consisting essentially of from about 4% to 70% of fat, from about 25% to 95% of sugar and from about 0.3 to 2.4% of gelatin, the pH of a mixture of said base and water being between about 6 to 8.

10. The method of making a dried base for a food product comprising making a water emulsion of a fat, an edible sugar and an acid type gelatin having an isoelectric point between pH of about 7 to 9, adjusting the pH of said emulsion to between about 2 to 4.3 and drying said emulsion.

11. The method of making a dried base for a food product comprising making a water emulsion of a fat, and edible sugar and an alkali type gelatin having an isoelectric point between pH of about 4.7 to 5.2, adjusting the pH of said emulsion to between about 1 to 3, and drying said emulsion.

12. The method of making a dried base for a food product comprising making a water emulsion of a fat, an edible sugar and an alkali type gelatin having an isoelectric point between pH of about 4.7 to 5.2, adjusting the pH of said emulsion to between about 6 to 8, and then drying said emulsion.

References Cited in the file of this patent

UNITED STATES PATENTS

| Number | Name | Date |
|---|---|---|
| 2,035,899 | Kraft | Mar. 31, 1936 |
| 2,161,029 | Eckerich et al. | June 6, 1939 |
| 2,369,847 | Olsen et al. | Feb. 20, 1945 |
| 2,392,833 | Chapin | Jan. 15, 1946 |
| 2,431,497 | North et al. | Nov. 25, 1947 |